May 18, 1965 C. D. GARDNER 3,184,275

FORCED AIR COOLING OF ELECTRONIC EQUIPMENT

Filed Oct. 25, 1963

INVENTOR.
COLIN D. GARDNER

BY

Lawrence S. Galke
ATTORNEYS

United States Patent Office 3,184,275

Patented May 18, 1965

3,184,275

FORCED AIR COOLING OF ELECTRONIC EQUIPMENT

Colin D. Gardner, Glen Burnie, Md., assignor, by mesne assignments, to the United States of America as represented by the Secretary of the Air Force Filed Oct. 25, 1963, Ser. No. 319,081
2 Claims. (Cl. 312—213)

This invention relates generally to forced air cooling of electronic equipment and particularly to an improved air cooled cabinet for electronic equipment.

Cabinets having a series of vertical or horizontal drawers are often used to house electronic equipment. Cooling is normally provided by an air flow through the cabinet in a direction perpendicular to the plane of the drawers. A disadvantage of this cooling scheme is that the air flow is "short circulated" whenever one or more drawers is opened or removed, thereby causing a loss in ventilation to the remaining closed drawers.

Therefore it is an object of this invention to improve the ventilation of electronic equipment.

It is an object of this invention to provide an air cooling system in a cabinet that will not be disturbed by the opening or removal of drawers therefrom.

Another object is to provide air cooling in quantities according to the requirements of individual drawers in a cabinet.

It is still another object to provide a cabinet for electronic equipment which is economical to produce and which utilizes conventional, currently available materials that lend themselves to standard mass production manufacturing techniques.

Figure 1:
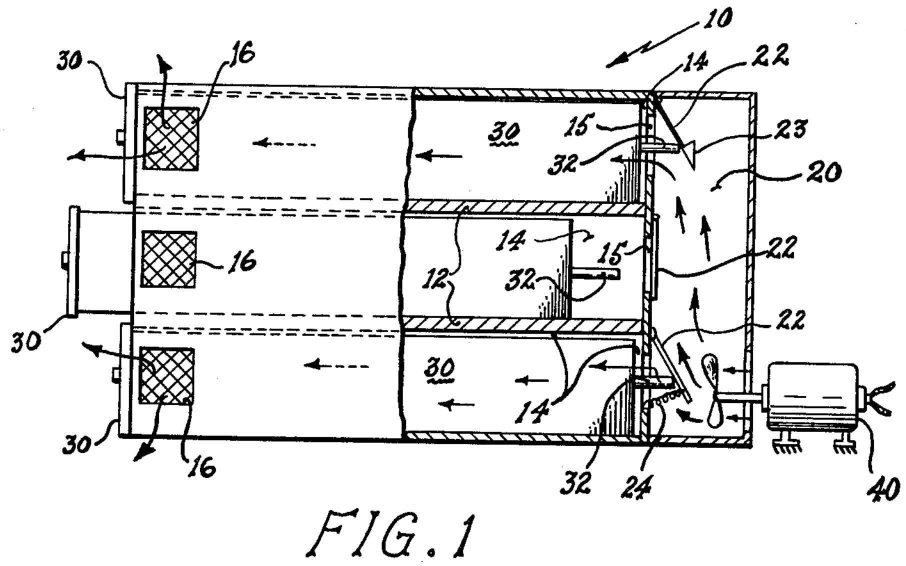
Figure 2:
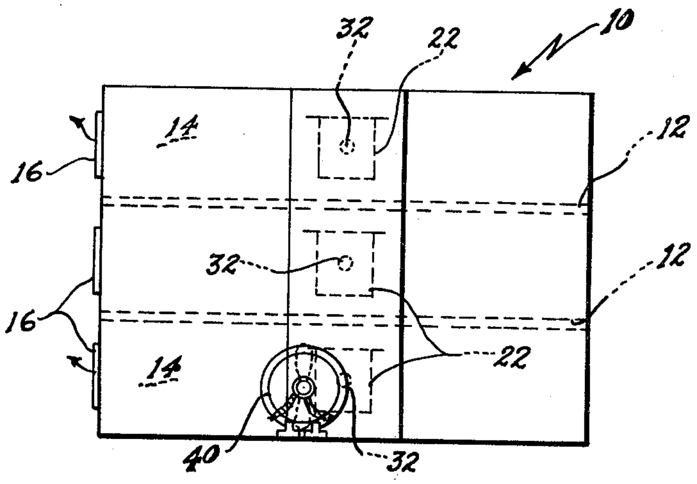

Further and other objects and a fuller understanding of the invention may be had by referring to the following description and claims, taken in conjunction with the accompanying drawings in which:

FIG. 1 is a schematic side elevation, partially in cross section, representing the invented cabinet; and FIG. 2 is a schematic back elevation.

With reference to the drawings, the outer cabinet housing 10 is divided within by partitions 12 to form individual compartments 14. As illustrated in the figures, the compartments are pneumatically separate since air cannot pass directly from one to another. Furthermore, utilizing known materials of desired thermal and electrical properties for the partitions 12, will provide separate compartments 14, each insulated electrically and thermally from the others. Thus it is possible to house within the same cabinet components requiring different thermal environments or requiring electrical shielding from each other. Inlet openings 15 and outlet openings 16 are provided for each compartment 14 as shown. The size of openings 15 and 16 is related to the cooling requirements of each individual compartment 14.

Plenum chamber 20 is a duct of accommodating size for conveying forced air to the inlet openings 15. Valves to close openings 15 are provided by flaps 22. As illustrated, the flaps 22 are hinged within chamber 20 above inlet openings 15 so that the flaps will swing down, of their own weight, to close the openings. If necessary, the flaps 22 may be biased to a closed position by a weight 23 or a spring 24.

The drawers 30, each containing electronic equipment, are instrted into compartments 14 as shown. Means for opening valves 22 upon insertion of drawers 30 are provided in this instance by plunger rods 32. The rods 32 are affixed at the back of drawer 30 at a position aligned with inlet openings 15. Thus, upon insertion of drawers 30 to a closed position, the rods 32 extend through openings 13 and push flap valves 22 to an open position. Note that the same result may be accomplished by affixing rods 32 to flaps 22 instead of drawers 30.

A source of forced air may be provided by any of the conventional means, in this case a fan 40. During operation of the cabinet, the air flow will be in the direction indicated by the arrows. The opening of the middle drawer a sufficient amount causes the rod 32 to disengage from valve flap 22, allowing it to close. The remaining air flow is undisturbed.

Although a single embodiment of the present invention has been illustrated and described, it will be apparent to those skilled in the art, that various changes and modifications may be made therein without departing from the spirit of the invenion or from the scope of the appended claims.

What is claimed is:

1. An air cooled cabinet for electronic equipment, comprising: a cabinet housing; partitions of electrical shielding material in said housing to form pneumatically and electrically mateiral in said housing to form pneumatically and electrically separate compartments therein, said compartments each having inlet and outlet openings designed to pass a desired air flow therethrough, said outlet opening being in communication with the exterior of said cabinet housing; a plenum chamber communicating with said compartments through said inlet openings; flap valves hinged in said chamber over said inlet openings to swing down and close said inlet openings; drawers containing electronic equipment inserted into said compartment; plunger rods extending through said inlet openings from said drawers upon insertion into said compartments to push said flaps upward and open said inlet openings; and a forced air source for said plenum chamber causing a cooling circulation through said cabinet.

2. An air cooled cabinet for electronic equipment, comprising: a cabinet housing; partitions of thermal insulating material in said housing to form pneumatically and thermally separate compartments therein, said compartments each having inlet and outlet openings designed to pass a desired air flow therethrough, said outlet opening being in communication with the exterior of said cabinet housing; a plenum chamber communicating with said compartments through said inlet openings; flap valves hinged in said chamber over said inlet openings to swing down and close said inlet openings; drawers containing electronic equipment inserted into said compartments; plunger rods extending through said inlet openings from said drawers upon insertion into said compartments to push said flaps upward and open said inlet openings; and a forced air source for said plenum chamber causing a cooling circulation through said cabinet.

References Cited by the Examiner

UNITED STATES PATENTS

| | | | |
|---|---|---|---|
| 1,922,456 | 8/33 | Powell | 62—266 |
| 2,131,680 | 9/38 | Zahodiakin | 62—266 |
| 2,145,982 | 2/39 | Roberts | 62—266 |
| 2,480,339 | 8/40 | Rifkin | 62—226 X |
| 2,561,517 | 7/51 | Ladge | 312—236 |
| 2,774,808 | 12/56 | Bullock | 174—16 |

FRANK B. SHERRY, *Primary Examiner.*

CHANCELLOR E. HARRIS, *Examiner.*